United States Patent [19]
Saiki

[11] Patent Number: 4,794,491
[45] Date of Patent: Dec. 27, 1988

[54] SOLID ELECTROLYTE CAPACITOR

[75] Inventor: Yoshihiko Saiki, Tokyo, Japan

[73] Assignee: NEC Corporation, Tokyo, Japan

[21] Appl. No.: 62,103

[22] Filed: Jun. 12, 1987

[30] Foreign Application Priority Data

Jun. 12, 1986 [JP] Japan .................................. 61-137364

[51] Int. Cl.[4] .............................................. H01G 9/00
[52] U.S. Cl. .................................................... 361/532
[58] Field of Search ........... 361/433 A, 433 C, 433 S, 361/433 T

[56] References Cited

U.S. PATENT DOCUMENTS

| | | | |
|---|---|---|---|
| 3,349,294 | 10/1967 | Heinimann et al. | 361/433 |
| 3,516,150 | 6/1970 | Leech | 361/433 X |
| 3,581,159 | 5/1971 | Piper et al. | 361/433 |
| 4,009,424 | 2/1977 | Itoh | 361/433 |
| 4,330,929 | 5/1982 | Cripe | 361/433 X |

FOREIGN PATENT DOCUMENTS

| | | | |
|---|---|---|---|
| 83020 | 7/1981 | Japan | 361/433 |
| 112714 | 9/1981 | Japan | 361/433 |

Primary Examiner—Donald A. Griffin
Attorney, Agent, or Firm—Laff, Whitesel, Conte & Saret

[57] ABSTRACT

A solid electrolyte capacitor has an anode body made of valve-metal with an anode wire extending from one surface of the body. A dielectric layer is formed on the anode wire and body. A solid electrolyte layer is formed on the dielectric layer. A first conductive layer is formed in a low resistance contact with said solid electrolyte layer. A metal layer is formed on the first conductive layer. A solder layer is formed on the metal layer. According to the invention, the metal layer is an electroless-plated metal layer, and a second conductive layer is positioned between the first conductive layer and the electroless-plated metal layer. This construction prevents a penetration of plating solution. A third conductive layer containing a powder of a plating catalyst may be located between the second conductive layer and the electroless-plated metal layer. A water-repellent insulating resin coating may be formed on the solid electrolyte layer which is located on one surface of this anode body. An end portion of the insulating coating is sandwiched between the first and second conductive layers.

9 Claims, 3 Drawing Sheets

SOLID ELECTROLYTE CAPACITOR

BACKGROUND OF THE INVENTION

This invention relates to a solid electrolyte capacitor, and more particularly to a cathode structure thereof.

In general, a solid electrolyte capacitor element comprises a sintered porous anode body of a valve-metal such as tantalum, an anode wire of the same valve-metal partly embedded into the anode body, an oxide film of the valve-metal covering the surfaces of the anode body and the anode wire, a solid electrolyte layer of, for instance, manganese dioxide ($MnO_2$) overlaying the oxide film, and a cathode layer coated on the solid electrolyte layer. The cathode layer includes a graphite layer provided on the solid electrolyte layer, a plated metal layer of copper, nickel or another highly conductive metal, and a solder layer successively formed on the graphite layer. The plated metal layer is used in place of a silver paste layer which is expensive and presents problems in that the silver paste tends to be melted by the heat generated when the solder layer is formed in order to cause a so-called silver leaching phenomenon. That is, silver particles are diffused into a solder bath, thereby causing an exfoliation of the solder layer and/or increase in tangent of dielectric loss (referred to as "tan" δ herein). Permeating moisture ionizes the silver paste and silver ions reach the oxide film to cause a chemical reaction, which often damages the oxide film to increase linkage current. The plated metal layer is formed by the electroless plating technique.

Japanese patent application laid-open under No. Sho 59-63716 teaches a cathode layer which comprises a first graphite layer coated on the solid electrolyte layer to reduce the equivalent series resistance of the anode body. A second graphite layer contains thermal resistant resin to prevent a penetration of the plating solution into the solid electrolyte layer and formed on the first graphite layer, and a plated nickel layer. Since the normal graphite layer, such as the first graphite layer, is not enough to prevent the plating solution from penetrating onto the solid electrolyte layer, the second graphite layer is effective to prevent a degradation of the electrical properties of the capacitor. However, it is extremely difficult to perform the electroless plating on the second graphite layer containing graphite and thermal resistant resin to form the plated metal layer thereon. Though it is known that the graphite-coated capacitor element is immersed in an aqueous solution of stannous chloride, and then in an aqueous solution of palladium chloride to physically adsorb palladium particles on the graphite layer for activation of the graphite surface for the electroless plating of copper, nickel, etc., palladium particles are merely physically adsorbed on the graphite surface in this method. The adhesion of the formed plated layer to the graphite layer is extremely weak to cause an exfoliation of the plated layer by the thermal stress generated when the solder layer is formed upon the plated layer.

Another problem of the capacitor structure described by the above-mentioned Application is associated with a water-repellent insulating resin coating provided over the oxide film around the root of an anode wire, which is formed before the formation of the solid electrolyte layer for preventing direct contact between the oxide film and the plating solution.

As the insulating resin coating is water-repellent, however, the solid electrolyte layer of manganese dioxide is not formed on a peripheral portion of the insulating resin coating to expose the oxide film there because the manganese dioxide is pyrolyzed from the manganese nitrate solution. Under such a condition, the first graphite layer, the second graphite layer and the plated layer are formed to make contact with the insulating resin coating. The result is that either one of these cathode conductive layers comes into contact with the oxide film without intervention of the manganese dioxide layer to drastically reduce the reliability and/or increase the initial leakage current.

An object of this invention is to provide a solid electrolyte capacitor with an improved cathode structure.

Another object of this invention is to provide a solid electrolyte capacitor having a graphite layer containing a thermal resistant resin in which a plated metal layer adheres strongly to the graphite layer.

Still other object of this invention is to provide a solid electrolyte capacitor having a water-repellent insulating resin coating around the root of the anode wire which prevents a direct contact of the cathode layer to the oxide film.

SUMMARY OF THE INVENTION

According to the present invention, a solid electrolyte capacitor is featured by a third graphite layer containing a plating catalyst powder such as palladium provided on the second graphite layer. The electroless plated metal layer is formed on the third graphite layer. Another feature of the present invention is an insulating resin coated over the end portion of the first graphite layer around the root of the anode lead wire to cover the oxide film and the solid electrolyte layer exposed from the first graphite layer. The second graphite layer covers the pheripheral portion of the insulating resin.

In a preferred embodiment of the present invention, a solid electrolyte capacitor comprises an anode body of a valve-metal. An anode wire extends from one surface of the anode body. A dielectric film is on the anode body and the anode wire. A solid electrolyte layer is formed on the dielectric film. A first conductive layer is formed on the solid electrolyte layer and partly exposes the solid electrolyte layer and dielectric layer located on the one surface of the anode body. A water-repellent insulating layer is formed on the end portions of the first conductive layer, the solid electrolyte layer exposed from the first conductive layer and the dielectric layer exposed from the solid electrolyte layer. The first conductive layer body is in contact with the solid electrolyte layer at a low resistance. A second conductive layer is formed on the first conductive layer for preventing a penetration of the plating solution or of hydrogen ions therein. A third conductive layer is formed on the second conductive layer and has plating catalyst particles therein. A plated metal layer is formed on the third conductive layer. A solder layer is formed on the plated metal layer.

DESCRIPTION OF THE PREFERRED EMBODIMENTS

Embodiment 1

Figure 1:
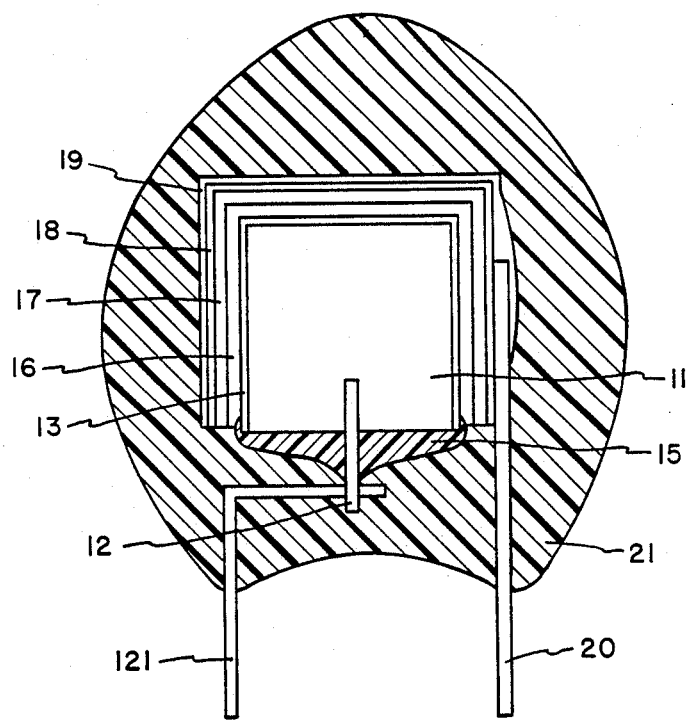
FIG. 1 is a vertical sectional view of an inventive embodiment of the solid electrolyte tantalum capacitor of a resin encapsulation type.

Referring to FIG. 1, tantalum powder is pressure-moulded and sintered in vacuum at a high temperature to form an anode body 11. A tantalum wire 12 is partly implanted therein. The anode body with the tantalum anode wire is supplied with a forming voltage of 100 V in an aqueous solution of phosphoric acid to be anodized and thereby to grow a film of tantalum oxide (not shown) on the anode body and the anode wire.

Thus formed, the anode element is then immersed in a manganese nitrate solution to make manganese nitrate adhere thereto, which is then pyrolyzed at a temperature of 200° to 250° C. to form a manganese dioxide layer (not shown) on the tantalum oxide film so as not to make direct contact with the anode body and wire. The immersion and pyrolysis are repeated several times.

The anode element with the manganese dioxide layer thus formed is immersed in a graphite solution and dried in the atmosphere at 150° to 200° C. to form a first conductive graphite layer 13 of 2 to 7 micron thickness on the manganese dioxide layer so as not to make direct contact with the tantalum oxide film. Polybutadiene is coated on a root of the tantalum wire 12 and the top surface having the tantalum wire 12 of the anode element and is then thermally dried in the atmosphere at 150° to 180° C. to form a water-repellent insulating resin coating 15 which completely covers the exposed portion of the manganese dioxide layer and the tantalum oxide film as well as the end portion of the first graphite layer 13. The resin layer 15 favorably hangs over the shoulder portion of the anode element 11 as shown in FIG. 1. Then, 20 to 60 wt% of epoxy resin as a water-insoluble polymer, 2 to 10 wt% of imidazole as a curing agent, 10 to 50 wt% of graphite powder as a conductive material and 10 to 40 wt% of butylcarbitol acetate as a solvent are admixed and kneaded to form a conductive paste. The paste is diluted with butyl cellosolve. The anode element is immersed into the dilute solution until it makes contacts with the end of the insulating resin coating 15. The thus applied paste is thermally cured in the atmosphere at 150° to 200° C. to form a second conductive layer 16 of 20 to 30 microns in thickness. The peripheral portion of the insulating resin coating 15 is sandwiched between the second conductive layer 16 and the first conductive layer 13.

Then, 20 to 60 wt% of epoxy resin, 2 to 10 wt% of a curing agent, 3 to 20 wt% of calcium carbonate as a heat resistant inorganic material (1 to 30 microns in diameter), 1 to 10 wt% of palladium powder as a plating catalyst (less than 1 micron in diameter and adsorbed to calcium carbonate powder), 10 to 60 wt% of graphite powder, and 10 to 40 wt% ethyl cellosolve as a solvent are mixed and kneaded to form a conductive paste containing palladium which is then diluted with butyl cellosolve. The capacitor element on which the second conductive layer is formed is immersed in the dilute solution. The applied paste is thermally cured in the atmosphere at 150° to 200° C. to form a third conductive layer 17 of 20 to 30 micron thickness on the second conductive layer 16.

The capacitor element is then immersed in an aqueous solution of 5 vol% ammonia for 2 to 3 minutes to activate the palladium surface, is washed with pure water, and is subjected to electroless-plating. A nickel solution (pH=6.5 to 7.0 at room temperature) is used as an electroless plating solution with dimethyl aminoborane as a reducing agent. Plating is performed for 30 to 40 minutes at 63° to 67° C. to grow about 5 microns of an electroless-plated nickel layer 18 on the third conductive layer 17.

After plating, the element is thoroughly washed, left standing in a constant temperature tank (120° to 150° C.) to vaporize the moisture, and then immersed in a molten solder bath at 230° to 250° C. to form a solder layer 19 on the plated layer 18.

Then the component is subjected to a well known assembly process for attaching external leads and encapsulation. An external anode lead 121 which is bent at the solderable end in the shape of letter L is welded to the tantalum wire 12. An external cathode lead 20 is soldered on the solder layer 19. The element is then encapsulated within a thermosetting resin material as an outer resinous layer 21 to finally form a solid electrolyte tantalum capacitor of resin encapsulation type.

Out of the solid electrolyte tantalum capacitors thus produced, 200 samples were randomly selected and subjected to heat and moisture resistance tests. The samples were immersed in solder baths of 240° C., 260° C., 280° C. and 300° C. for 10 seconds respectively in the heat resistance test. They were left standing in a moisture resistant tank at 85° C. and 95% RH for up to 1,000 hours. After each test, leakage current (35 V applied for one minute) and tan δ (measurement frequency 1 KHz) were measured. FIGS. 2 through 5 show the results of tests. For comparison, prior art solid electrolyte tantalum capacitors were also tested. These capacitors were formed by the same method using the same materials as in this embodiment, up to the stage of the first conductive paste formation. There were formed subsequently a silver paste layer, a solder layer, an external lead, and outer resin encapsulation.

Figure 2A:
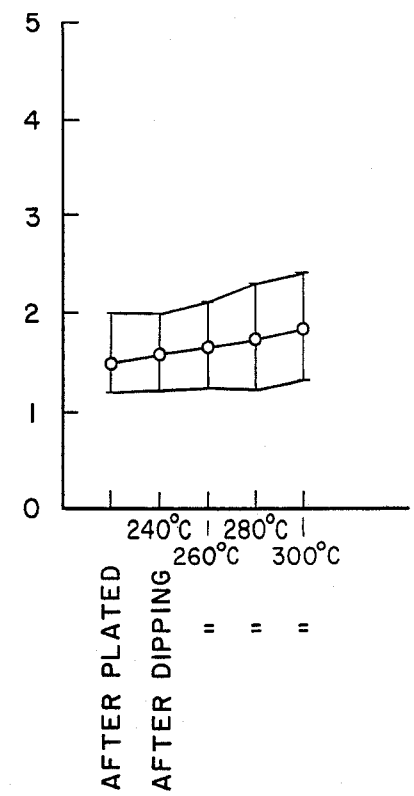
FIGS. 2A and 2B are graphs to show heat resistance characteristics in the soldering process of the embodiment of the inventive solid electrolyte tantalum capacitor of a resin encapsulation type.
Figure 2B:
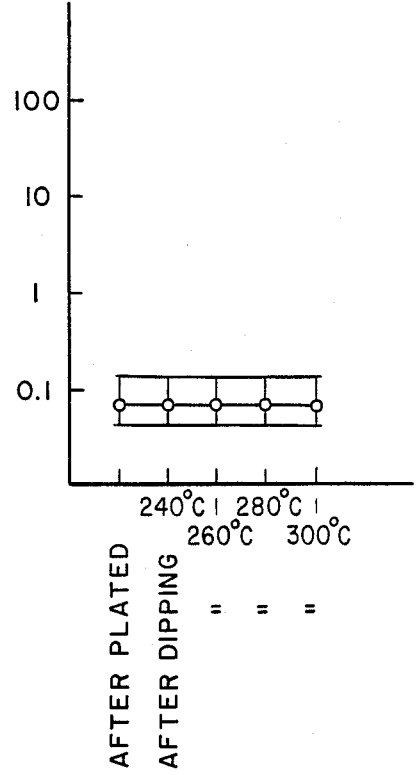

As shown in FIGS. 2A and 2B, the embodiment of this invention did not show any deterioration in tan δ and leakage current even when immersed in the solder bath at 300° C. for 10 seconds.

Figure 3A:
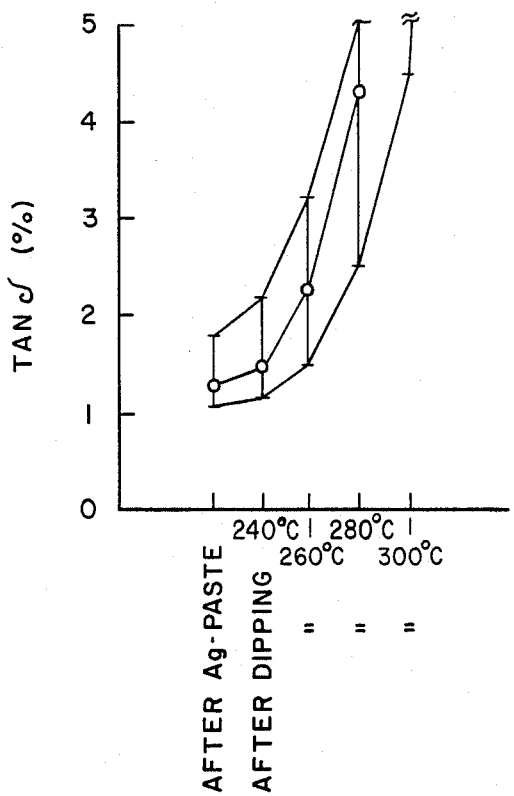
FIGS. 3A and 3B are graphs to show the heat resistance characteristics in the soldering of a prior art solid tantalum capacitor of a resin encapsulation type.
Figure 3B:
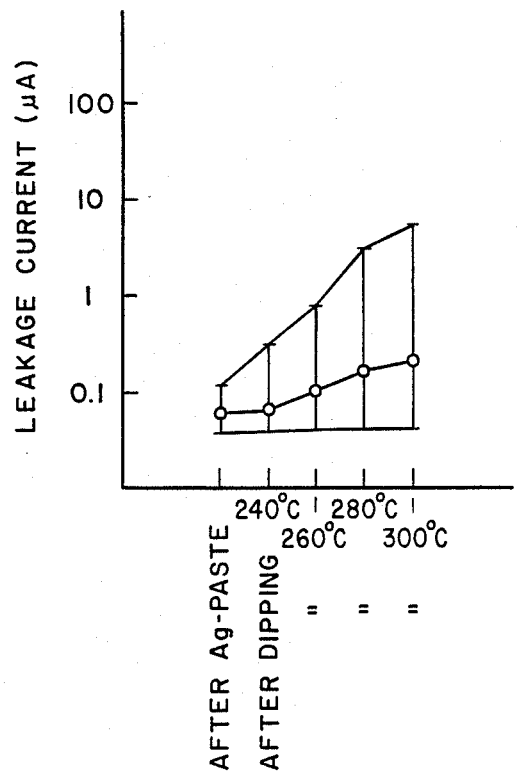

On the other hand, the prior art samples showed deterioration in tan δ from 260° C. At 300° C., deterioration amounted to the extent that the initially established distribution was completely disrupted as shown in FIGS. 3A to 3B.

Figure 5A:
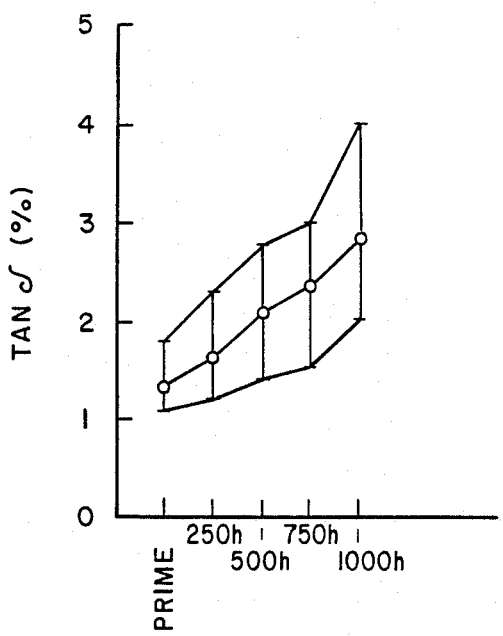
FIGS. 5A and 5B are graphs to show moisture resistance characteristics of a prior art solid tantalum capacitor of a resin encapsulation type.
Figure 4A:
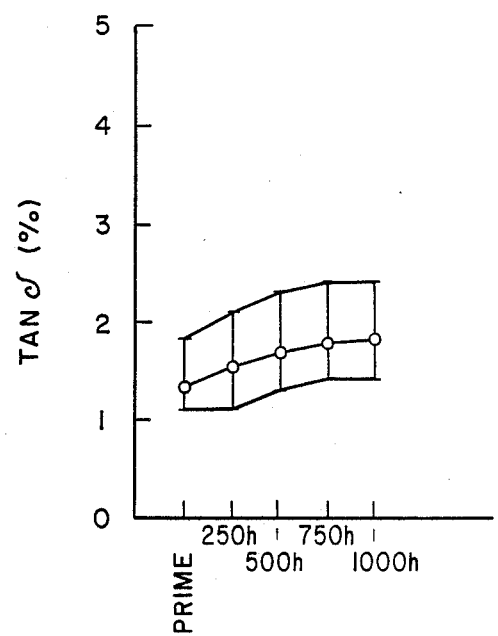
FIGS. 4A and 4B are graphs to show moisture resistance characteristics of a solid tantalum capacitor of a resin encapsulation type according to the present invention.
Figure 5B:
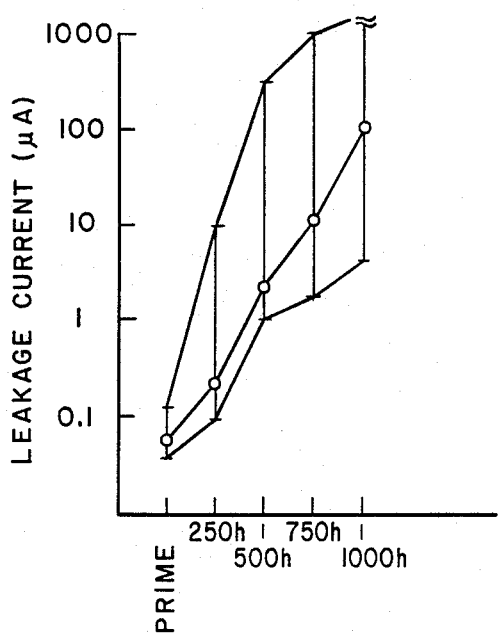
Figure 4B:
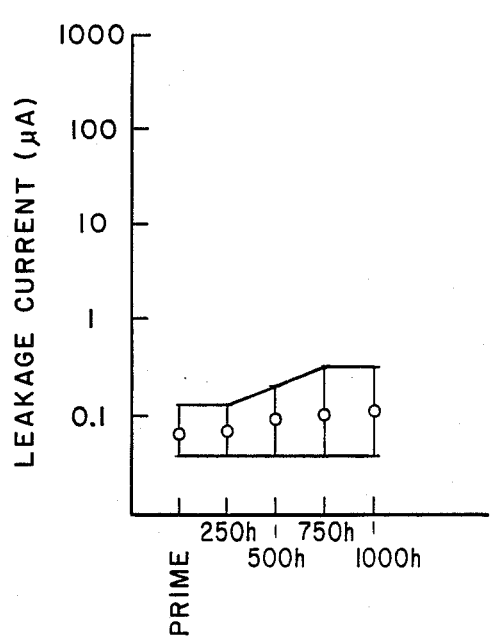

As is evident from FIGS. 4A and 4B, the samples produced according to this invention did not deteriorate significantly in tan δ and leakage current after 1,000 hours in the moisture resistance test. The prior art samples, on the other hand, showed excessive deterioration after 250 hours as shown in FIGS. 5A and 5B, particularly in leakage current.

Figure 6:
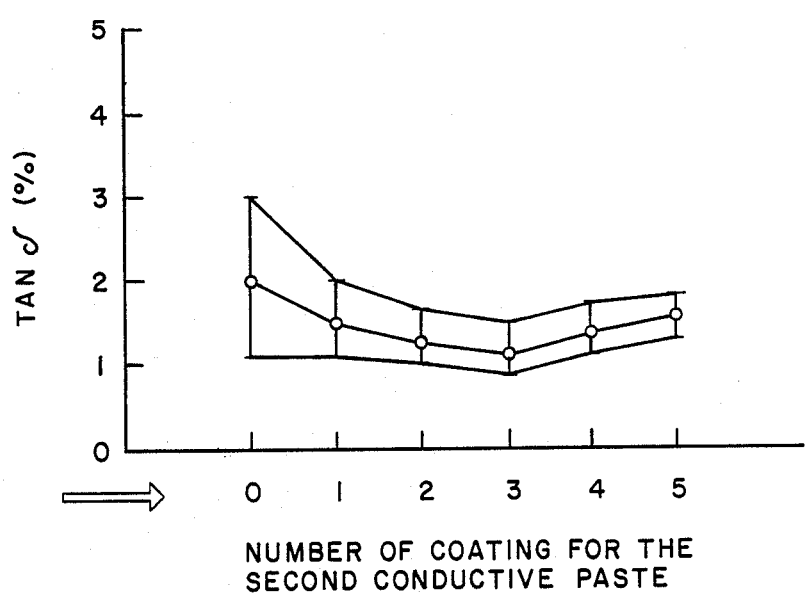
FIG. 6 is a graph to show the changes in tan which are caused δ by the changes in the number of coatings of the second conductive paste.

FIG. 6 shows the changes of tan δ when the number of coats of the second conductive layer was changed from 0 to 5 times in the manufacturing process. The tan δ slightly fluctuated when the second conductive layer was not formed. This means that the first and the third conductive layers alone cannot fully prevent the penetration of hydrogen ions and hydrogen gas which are generated by the electrolytic reaction. The purpose of the first conductive layer 13 is to fully impregnate a porous manganese dioxide layer with highly conductive graphite to reduce the resistance of the tantalum capacitor. The first layer 13 cannot contain a large amount of resin and therefore is not capable of preventing penetration of the plating solution completely. If the thickness of the third conductive layer 17 containing palladium catalyst is increased, it can serve as the second conductive layer 16, but the cost increases because of the expense of palladium.

In this test, the thickness achieved by making the coatings the third time (60 to 70 microns of thickness) showed the lowest tan δ. If the number of coats was increased by more than 3, the fluctuation of the values decreased, but the average of the values gradually increased. This is because, although the increased number of coats decreases, there is an adverse effect of the plating. The thickness of the second conductive layer inevitably increases to increase the resistance of the second conductive layer.

Embodiment 2

An element was formed with the same materials and method as the first embodiment up to the stage of the third conductive layer formation. The element was then immersed in an electroless copper plating bath with formalin as a reducing agent, for one hour at 50° to 60° C. to form an electroless plated copper layer of 3 to 5 microns thickness. EDTA was used as a chelating agent. After washing and drying, the element was provided with a solder layer, an external lead, and an outer resin layer to finally form a solid electrolyte tantalum capacitor of resin encapsulation type. The capacitor was then subjected to the heat and moisture resistance tests in the manner similar to those conducted in Embodiment 1. Similarly to the first embodiment which was plated with nickel, this sample did not show any significant deterioration in tan δ and leakage current in the heat and moisture resistance tests. The initial tan δ value was slightly smaller in the copper plated sample than the nickel plated one. This is attributable to the fact that the specific resistance of copper is smaller than that of nickel.

An example of a mixture ratio of the paste for the second conductive layer in the above-mentioned embodiments is 39 wt% epoxy resin, 29 wt% graphite powder, 5 wt% curing agent, and 27 wt% solvent. An example of the ratio for the third conductive layer is 36 wt% epoxy resin, 25 wt% graphite powder, 4 wt% curing agent, 8 wt% calcium carbonate, 5 wt% palladium and 22 wt% solvent. After thermally cured, the resin content becomes 60 wt% and the graphite content 40 wt% in the second conductive layer while the resin content becomes 50 wt%, the graphite content 32 wt%, calcium carbonate 11 wt% and palladium 7 wt% in the third conductive layer.

As the resin content in the second and third conductive layers increases, the adherence between layers increases. However if the content exceeds 70 wt%, tan δ inconveniently increases. If the content is less than 22 wt%, the adherence between layers becomes too small to be practical. The preferable range of the resin content in the second and third conductive layers therefore is 22 to 70 wt%.

As the amount of graphite increases, the specific resistance decreases, but it also entails a deterioration in adherence to the first conductive layer, thus lowering the reliability. The range desirable for the content of graphite therefore is 11 to 56 wt% in the second conductive layer and 11 to 67 wt% in the third conductive layer.

Although the increased amount of palladium increases the precipitation in plating, it also pushes up the cost. Considering the balance between precipitation and cost, the desirable range of palladium content is 2 to 12 wt%. As the amount of calcium carbonate increases, the adhesion of plated layers increases, but it also deteriorates the strength and/or specific resistance of the third conductive layer. The desirable range of the calcium carbonate content therefore is 2 to 23 wt%.

The feature of the present invention is in the third conductive layer which contains a water-insoluble polymer, conductive powder, catalyst powder, and thermally resistant inorganic powder. A plated metal layer of nickel or copper is formed on the third conductive layer. Another feature is in the location of the insulating resin coating which is located so as to make contact with the first and second conductive layers.

The solid electrolyte capacitor of the embodiment has the following effects:

(i) Since the capacitor does not contain a silver paste layer which is thermally and chemically instable, the heat and moisture resistance thereof can be improved.

(ii) Since the third conductive layer contains a heat resistant inorganic powder adsorbed with a palladium catalyst, it does not need to be immersed in a strong acidic solution for an activation treatment such as stannous chloride solution and palladium chloride solution. It is free of bad effects which might otherwise be caused by the melting of manganese dioxide or by the diffusion of various ions. Since palladium particles of relatively small diameter are adsorbed to form a thermally resistant inorganic powder of relatively large particle diameter and since the powder is bonded with water-insoluble resin containing graphite powder, an adhesion of the plated metal layer can be enhanced by the anchor effect. Since the palladium catalyst is adsorbed on the thermally resistant inorganic powder of a larger particle diameter and is exposed to the surface of the third conductive layer and since the catalyst is, not completely buried in the third conductive layer, an excellent precipitation of the plated layer can be obtained with a small amount of palladium powder to enhance economic advantage.

(iii) The second conductive layer protects the anode element from hydrogen ions and from hydrogen gas, which are produced as the plating reaction is provided on the first graphite layer which reduces resistance of the capacitor. Moreover a water-repellent insulation resin coating is formed on the regions surrounding the anode wire where the second conductive layer does not cover. Therefore, the tan δ or electric leakage current, which might otherwise be caused by electroless plating, can be prevented from increasing.

(iv) The insulating resin coating is formed after the manganese dioxide layer and the first graphite layer are formed. The second conductive layer, the third conductive layer and the electroless plated layer are thereafter formed. None of the first graphite layer, the second and third conductive layers and the electroless-plated layer comes into direct contact with the oxide film.

Thus, the invention eliminates the troubles which might otherwise be caused by the leakage current.

Although epoxy is used as the resin content in the second and third conductive pastes in the above embodiments, the resin may be acryl, cellulose, modified phenole epoxy, polyvinyl chloride, fluoroelastomer, acrylic polymer of fluorine group or a mixture of any of them. The material of the water-repellent insulating resin coating is not limited to polybutadiene resin, but may be selected from the resins mentioned above. Palladium powder included in the third conductive layer may be replaced with powder of active metals such as copper, nickel, tin, and silver or a mixture of any of them, although the precipitation of plating is slightly lowered. The material for the thermally resistant inorganic powder may be the powder of alumina, kaoline, sodium sulphate, calcium phosphate or silica powder which is used either singly or together in mixture.

In the embodiment shown in FIG. 1, the extended leads are attached in the same direction when the resin encapsulation is performed. Any other external lead structure and chip-type structure are applicable and any other encapsulation can be used.

What is claimed is:

1. A solid electrolyte capacitor comprising: an anode body of valve-metal, an anode wire extended from one surface of said anode body, a dielectric layer formed on said anode wire and said anode body, a solid electrolyte layer formed on said dielectric layer, a first conductive layer formed on said solid electrolyte layer, a second conductive layer formed on said first conductive layer and containing a material to prevent penetration of hydrogen ions therethrough, a third conductive layer formed on said second conductive layer and containing a powder of plating catalyst, an electroless-plated metal layer formed on said third conductive layer, and a solder layer formed on said plated metal layer.

2. A solid electrolyte capacitor comprising: an anode body of valve-metal, an anode wire extended from one surface of said anode body, a dielectric layer formed on said anode wire and said anode body, a solid electrolyte layer formed on said anode wire and said anode body, a solid electrolyte layer formed on said dielectric layer, a first conductive layer formed on said solid electrolyte layer, a second conductive layer formed on said first conductive layer and containing a material to prevent a penetration of hydrogen ions therethrough, a third conductive layer formed on said second conductive layer and containing a powder of plating catalyst, a plated meter layer formed on said third conductive layer, a solder layer formed on said plated metal layer, and a water-repellent insulating coat provided on said one surface of said anode body, an end portion of said insulating coating being sandwiched between said first conductive layer and said second conductive layer.

3. A solid electrolyte capacitor comprising: an anode body of valve-metal, an anode wire extended from one surface of said anode body, a dielectric layer formed on said anode wire and said anode body, a solid electrolyte layer formed on said dielectric layer, a first conductive graphite layer formed on said solid electrolyte layer, a second conductive layer formed on said first conductive layer and containing a material to prevent penetration of hydrogen ions therethrough, said second conductive layer being a layer made of a mixture of a water-insoluble polymer and graphite powder, a third conductive layer formed on said second conductive layer and containing a powder of plating catalyst, said third conductive layer being a layer made of the mixture of water-insoluble polymer, graphite powder, plating catalyst powder and thermal resistant inorganic powder, a plated metal layer formed on said third conductive layer, and a solder layer formed on said plated metal layer.

4. The solid electrolyte capacitor as claimed in claim 3 wherein said first conductive layer is of 2 to 7 microns in thickness while said second and third conductive layers are of 20 to 30 microns in thickness respectively.

5. The solid electrolyte capacitor as claimed in claim 4 wherein the amount of said graphite powder in said second conductive layer is in the range of 11 to 56 wt% and the amount of said graphite powder in said third conductive layer is in the range of 11 to 67 wt%, said plating catalyst powder being substantially 2 to 12 wt% and said thermal resistant inorganic powder being substantially 3 to 23 wt%.

6. The solid electrolyte capacitor as claimed in claim 3 wherein said plating catalyst powder is selected from the group consisting of powders of palladium, copper, nickel, tin, and silver or the mixture thereof and said thermal resistant inorganic powder is selected from the group consisting of sodium sulphate, calcium phosphate, alumina, kaoline, and silica or mixture thereof.

7. A solid electrolyte capacitor comprising: an anode body of valve-metal, an anode wire extended from one surface of said anode body, a dielectric layer formed on said anode wire and said anode body, a solid electrolyte layer formed on said dielectric layer, a first conductive layer solid electrolyte layer and partly exposing said solid electrolyte layer and dielectric layer located on said one surface of said anode body, a water-repellent insulating resin coating formed on the peripheral end of said first conductive layer, on said solid electrolyte layer exposed on said first conductive layer and on said dielectric layer exposed from said solid electrolyte layer, said first conductive layer being in a low resistance contact with said solid electrolyte layer, a second conductive layer formed on said first conductive layer so as to prevent a penetration of hydrogen ions, a third conductive layer formed on said second conductive layer and having a powder of a plating catalyst, an electroless-plated layer formed on said third conductive layer and a solder layer formed on said electroless-plated layer.

8. In a solid electrolyte capacitor having an anode body of valve-metal, an anode wire extending from one surface of said anode body, a dielectric layer formed on said anode wire and said anode body, a solid electrolyte layer formed on said dielectric layer, a first conductive layer formed on said solid electrolyte layer, said first conductive layer being in a low resistance contact with said solid electrolyte layer, a metal layer formed on said first conductive layer and a solder layer formed on said metal layer, said metal layer being an electroless-plated metal layer, a second conductive layer being said first conductive layer and said electroless-plated metal layer for preventing a penetration of plating solution, and a third conductive layer containing a powder of plating catalyst between said second conductive layer and said electroless-plated metal layer.

9. The solid electrolyte capacitor claimed in claim 8, further comprising a water-repellent insulating resin coating formed on said solid electrolyte layer and located on said one surface of said anode body, an end portion of said insulating coating being sandwiched between said first conductive layer and said second conductive layer.

* * * * *